United States Patent
Ono

(10) Patent No.: US 6,536,576 B2
(45) Date of Patent: Mar. 25, 2003

(54) PARKING LOCK DEVICE FOR A SADDLE RIDING TYPE VEHICLE

(75) Inventor: Masaki Ono, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 10 days.

(21) Appl. No.: 09/847,483

(22) Filed: May 2, 2001

(65) Prior Publication Data
US 2001/0045337 A1 Nov. 29, 2001

(30) Foreign Application Priority Data
May 29, 2000 (JP) .................................. 2000-158173

(51) Int. Cl.[7] ............................................... B60T 1/06
(52) U.S. Cl. .................... 192/219.5; 180/292
(58) Field of Search .................. 192/219.5; 188/31, 188/69; 180/292

(56) References Cited

U.S. PATENT DOCUMENTS

| 3,703,941 A | * 11/1972 | Ohie et al. ............... 192/219.5 |
| 4,369,867 A | * 1/1983 | Lemieux .................. 192/219.5 |
| 4,600,074 A | * 7/1986 | Watanabe et al. ............ 180/241 |
| 6,182,800 B1 | * 2/2001 | Mochizuki et al. ....... 188/18 A |

FOREIGN PATENT DOCUMENTS

| JP | 10-100872 | 4/1998 | ............. B60T/1/06 |
| JP | 11-170989 | 6/1999 | ............. B60T/1/06 |
| JP | 11-303991 | 11/1999 | ........... F16H/63/34 |

* cited by examiner

Primary Examiner—Rodney H. Bonck
(74) Attorney, Agent, or Firm—Darby & Darby

(57) ABSTRACT

A cam plate is axially supported on an actuator shaft (cam shaft) arranged in a housing, perpendicularly to a pinion shaft so that it can rotate about the cam shaft. As the cam plate rotates, an engagement piece sways in conformity with the cam shape of the cam, so that a claw of the engagement piece can become engaged with or disengaged from a parking gear, whereby parking lock is locked or released.

3 Claims, 5 Drawing Sheets

PARKING LOCK DEVICE FOR A SADDLE RIDING TYPE VEHICLE

BACKGROUND OF THE INVENTION

(1) Field of the Invention

The present invention relates to a parking lock device for a saddle riding type vehicle called a four-wheel buggy for rough terrain which is maneuvered by a rider straddling the saddle type seat thereof by gripping its handlebars, and in particular relates to a parking lock device for locking the wheels of the vehicle so that it will not be moved when parked.

(2) Description of the Prior Art

A typical saddle riding type vehicle has parking cams arranged in its drum brakes in the left and right rear-wheels so that the rear-wheels can be locked by actuating the drum brakes when it is parked.

Other than the above, there is a parking brake configuration in which the gear shaft of the transmission connected to the engine is locked by arranging a lock gear fixed at one side of the gear shaft of the gear transmission and a parking cam and actuator at one side of a transmission cam drum for making a change in gear so that the distal end of the actuator meshes the lock gear (see Japanese Patent Application Laid-Open Hei 11 No.30991, for example).

The configuration using the gear shaft of the gear transmission and the transmission cam drum needs a long gear shaft and a long transmission cam drum. Hence, the width of the transmission case becomes larger. Since a vehicle of this type generally uses its engine case integrally formed with the transmission case, use of the above configuration affects greatly and needs a serious design change with a large weight increase for the case. Further, since the gear shaft and transmission cam drum should be arranged in a fixed relationship, this greatly restrains the way of attachment of the actuator hence this configuration has difficulties in terms of cost and from a technical viewpoint.

SUMMARY OF THE INVENTION

In view of the above problems, it is therefore an object of the present invention to provide a parking lock device for a saddle riding type vehicle, which is compact and can be arranged in the housing for coupling the intermediate shaft to the axle shafts with a light design change.

In order to achieve the above object, the parking lock device for a saddle riding type vehicle of the present invention is configured as follows:

In accordance with the first aspect of the present invention, a parking lock device for a saddle riding type vehicle, wherein the engine power is transmitted as it is being varied in speed to the axle shafts via the final reduction gear which is comprised of an input shaft having a pinion gear at the distal end thereof, a housing axially supporting the input shaft, a bevel gear disposed on the output shaft side and meshing the pinion gear and a carrier axially supporting the bevel gear, includes:

a parking gear fixed on the input shaft;

a pivot element cantilevered and axially supported on a pivot shaft in the housing and having a projection on one side thereof, with respect to the direction of swaying, so that the projection is able to engage the parking gear; and a cam element axially supported on a cam shaft in the housing and abutting the pivot element on the opposite side with respect to the direction of swaying so as to sway the pivot element, and is characterized in that the pivot element sways as the cam element rotates so that the engagement projection of the pivot element becomes engaged with or disengaged from the parking gear to thereby lock and release parking lock.

In accordance with the second aspect of the present invention, the parking lock device for a saddle riding type vehicle having the above first feature is characterized in on the housing, a cam plate rotatable about the cam shaft and an urging element which rotationally urges the cam plate in one direction about the cam shaft.

In accordance with the third aspect of the present invention, the parking lock device for a saddle riding type vehicle having the above second feature is characterized in that the cam shaft is formed with a claw portion which restrains an excessive rotation of the cam plate due to the urging element in its urging direction and when parking lock is released the claw portion is able to rotate whilst keeping its abutment against the cam plate.

If in general a parking lock device is arranged on the axle shaft on the output side of the final reduction gear, a large braking force is needed. In contrast, in accordance with the present invention, since the parking lock device is arranged in the housing which axially supports the input shaft so as to lock the input shaft on the input side of the final reduction gear, it is possible to reduce the necessary braking force in the proportion of the gear ratio of the final reduction gear, hence provide a compact, lightweight parking lock device at a reduced cost.

Since the pivot element in which a projection engageable with the parking gear is formed on one side with respect to the direction of swaying is cantilevered and axially supported on the pivot shaft in the housing while the cam element abutting the pivot element on the opposite side thereof with respect to the direction of swaying so as to sway the pivot element is axially supported on the cam shaft in the housing, the parking lock mechanism can be made compact by providing the pivot element in the form of a cantilever. Further, since the pivot shaft and the cam shaft are laid out so as to be orthogonal to each other because of their positional relationship with the input shaft, the swaying direction of the pivot element and the rotational direction of the cam element are positioned approximately perpendicularly to each other, thus making it possible to reduce the layout space of the cam element.

It is preferable that the cam element is comprised of a cam shaft supported on the housing and a cam plate rotatable about the cam shaft and an urging element which rotationally urges the cam plate in one direction about the cam shaft. Since the cam plate rotationally urged by the urging element keeps on pressing the pivot element against the lock gear, it is possible to provide a waiting mechanism in a simple configuration.

It is preferable that the cam shaft is formed with a claw portion which restrains an excessive rotation of the cam plate due to the urging element in its urging direction and when parking lock is released the claw portion is able to rotate whilst keeping its abutment against the cam plate. Since the claw portion provided on the cam shaft rotates whilst keeping its abutment against the cam plate when parking lock is released, the waiting mechanism will not work, so that the locking state is undone by force. Therefore, it is possible to perform positive unlocking.

When the actuator shaft is rotated so that the actuator arm separates from the cam plate, the cam plate, urged by the elastic force of the pressing spring, pushes down the engagement piece opposing the release spring so that the engagement piece meshes the lock gear. This meshing fixes the intermediate shaft and the axle shafts hence establishes parking lock for locking the movement of the vehicle. When the actuator shaft is rotated in reverse so that the actuator arm rotates the cam plate to the releasing side, opposing the pressure of the pressing spring, the engagement piece becomes disengaged from the lock gear by the elastic force of the release spring, hence the locking state of the intermediate shaft is released thus creating a drive permissible state in which the axle shafts can rotate.

If the projection of the engagement piece has not yet engaged with the lock gear whilst being held off by its abutment against the raised portion of the lock gear, the engagement piece waits at that position where it abuts the raised portion. Then, as the lock gear turns in a small amount, the projection of the engagement piece meets the indentation of the lock gear so that the engagement piece sways by the elastic force of the pressing spring and becomes in mesh with the lock gear, establishing the locking state.

Finally, since the lock gear, engagement piece, actuator shaft and other associated parts are arranged in the housing, it is possible to provide a compact parking lock configuration by partial modification of the housing with a small increase in weight.

DESCRIPTION OF THE PREFERRED EMBODIMENTS

The embodiment of the present invention will hereinafter be described with reference to FIGS. 1 through 6.

Figure 6:
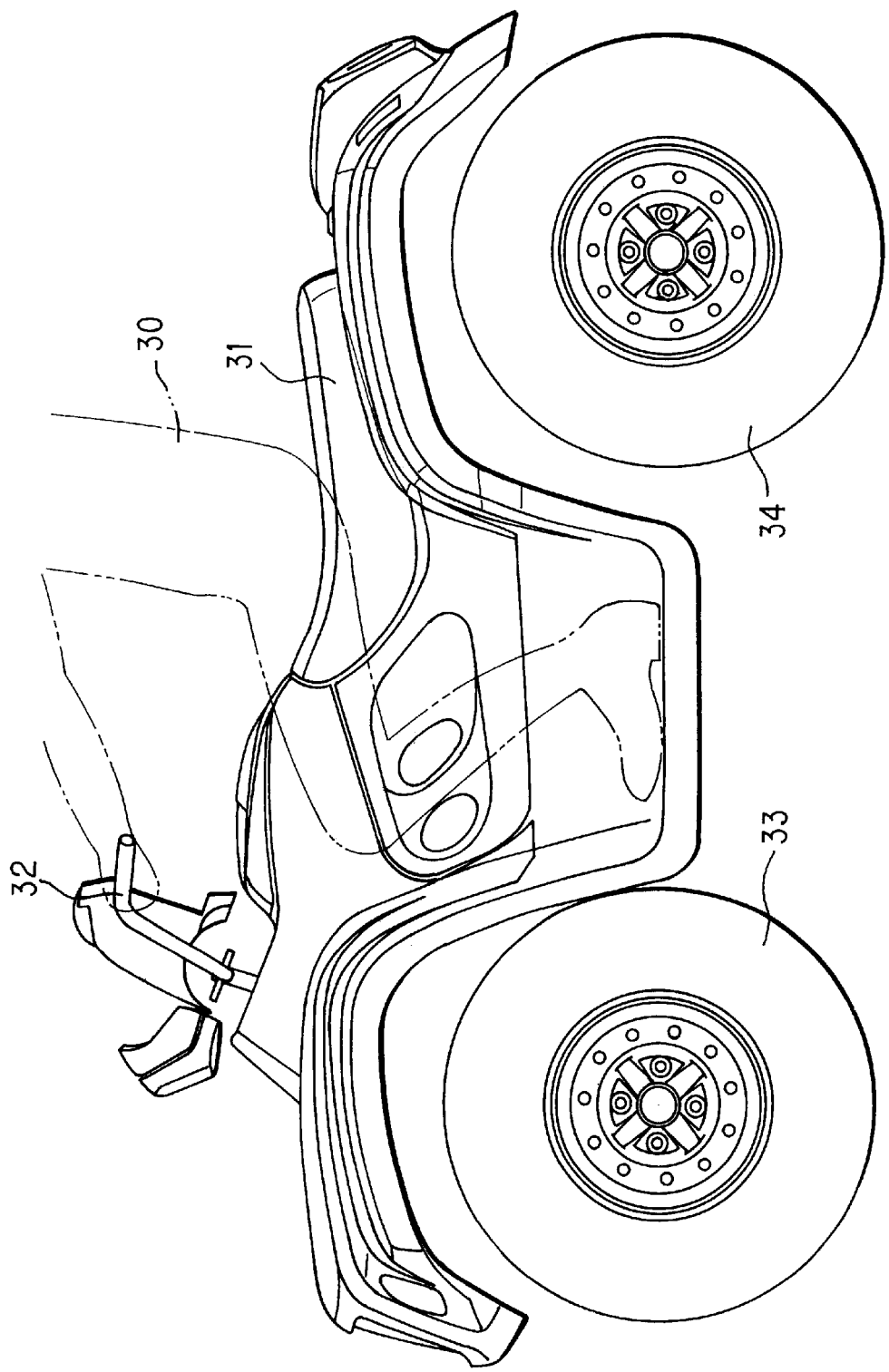
FIG. 6 is a side view showing an example of a saddle riding type vehicle in accordance with the embodiment.

The embodiment is a parking lock device mounted on a saddle riding type vehicle called as buggy, i.e., four-wheel drive vehicle which drives front and rear wheels 33 and 34 and hence is suitable for rough terrain being maneuvered by a rider 30 straddling a saddle type seat 31 thereof by gripping its handlebars 32, as shown in FIG. 6. The engine unit is mounted on the body under seat 31.

Figure 4:
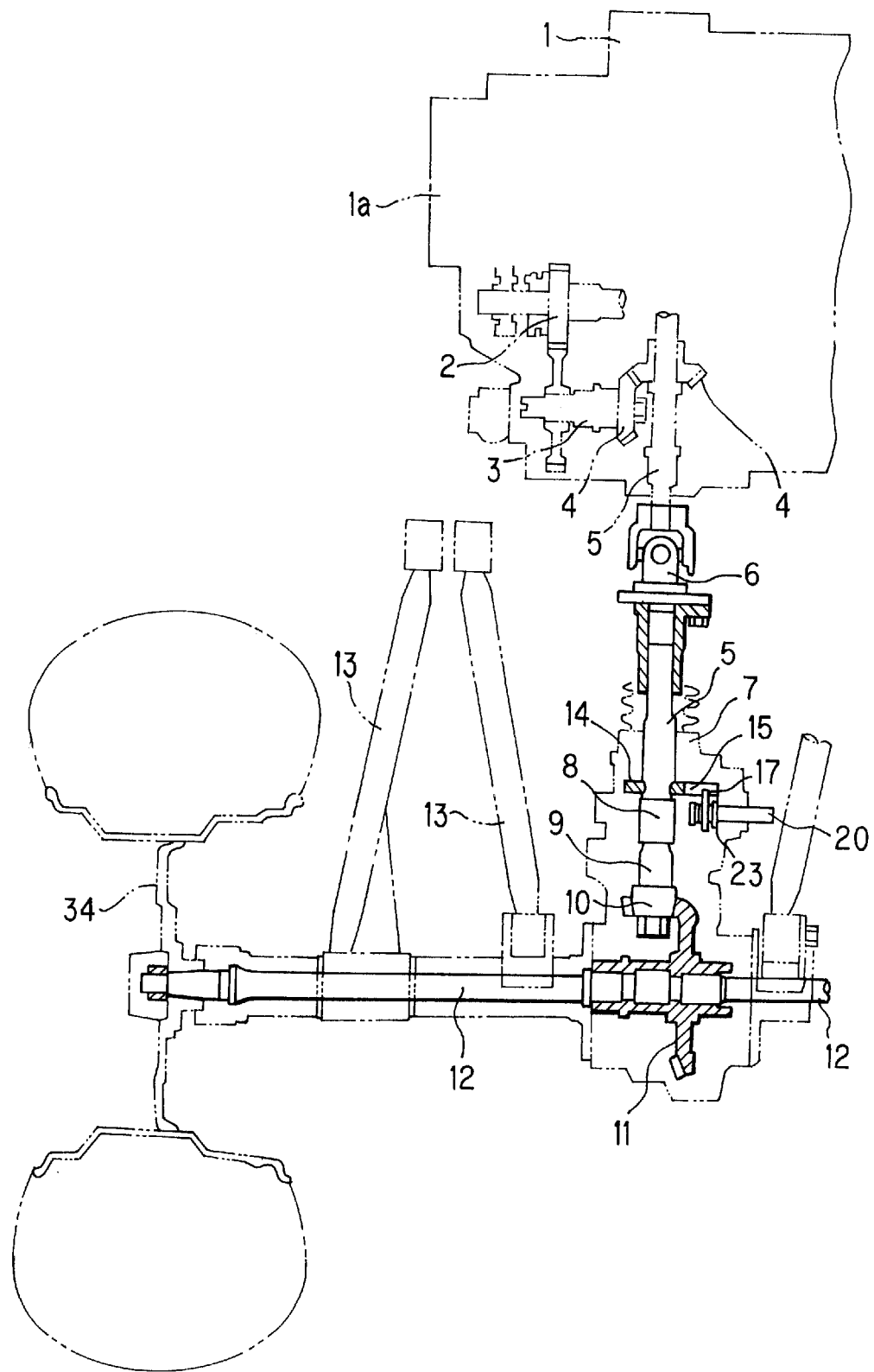
FIG. 4 is a horizontal section showing the driving system from the gear transmission of the engine to rear wheels in accordance with the embodiment of the present invention.

In this engine unit, as shown in FIG. 4, a gear transmission 2 is coupled on the rear side of an engine 1 so that the casing (engine case) 1a of gear transmission 2 and engine 1 are integrally formed. The power output shaft, designated at 3, of the gear transmission is coupled to an intermediate shaft 5 through a pair of bevel gears 4 and 4. This intermediate shaft 5 is coupled to the front and rear left and right axle shafts to drive the wheels.

The intermediate shaft 5 has a universal joint 6 attached at a partway position thereof with its rear end inserted in a housing 7 of the final reduction gear. Coupled to the rear end of intermediate shaft 5 is a pinion shaft 9 by means of a connection sleeve 8. This pinion shaft 9 in the housing has a pinion gear 10 which meshes a bevel gear 11. Bevel gear 11 is coupled with axle shafts 12 at both sides thereof, each axle shaft 12 has a rear wheel 34 at its distal end. The axle shaft 12 is suspended by the bodywork by means of a suspending mechanism 13.

Figure 1:
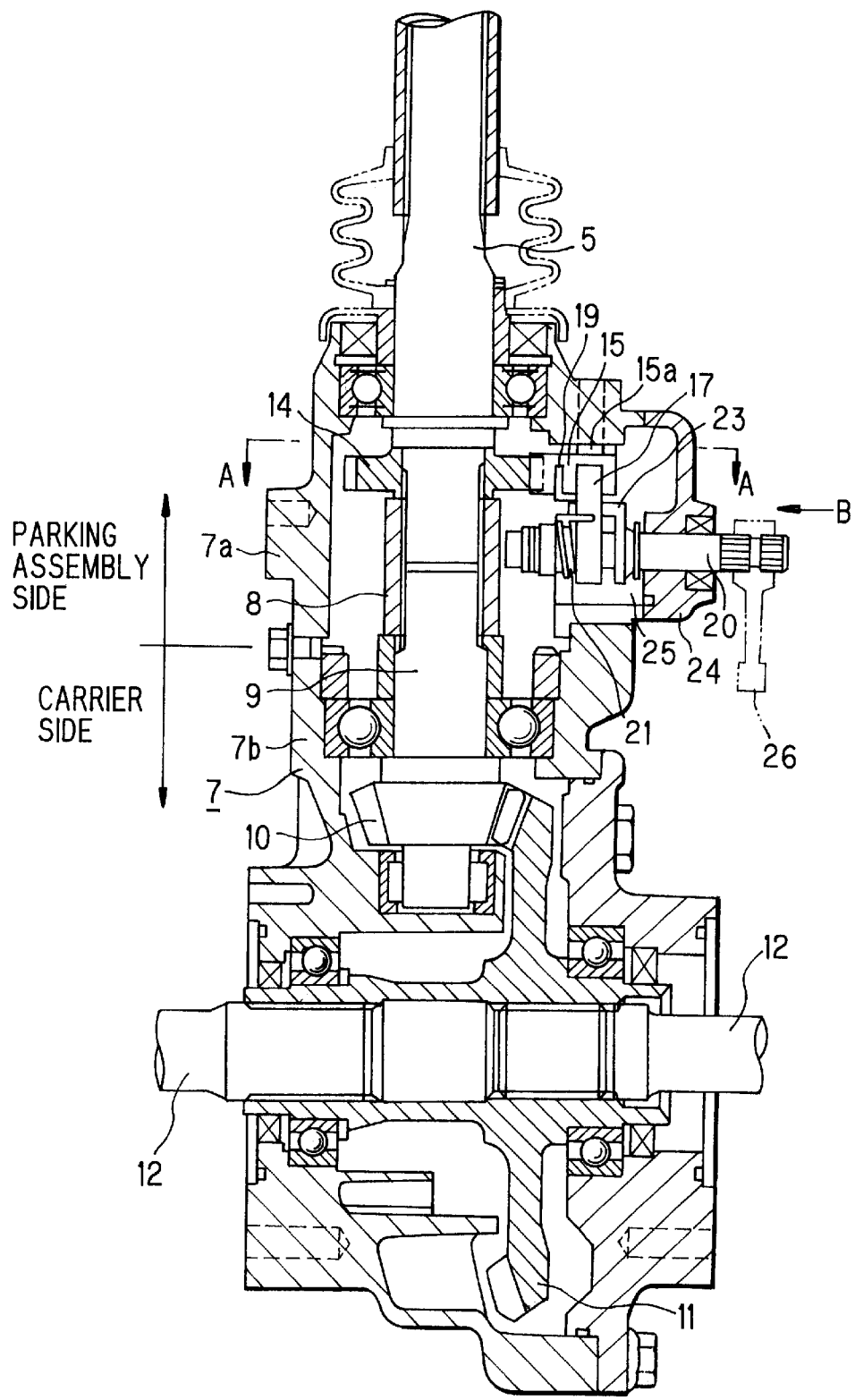
FIG. 1 is a horizontal section showing a housing portion of a parking lock device in accordance with the embodiment of the present invention.
Figure 2:
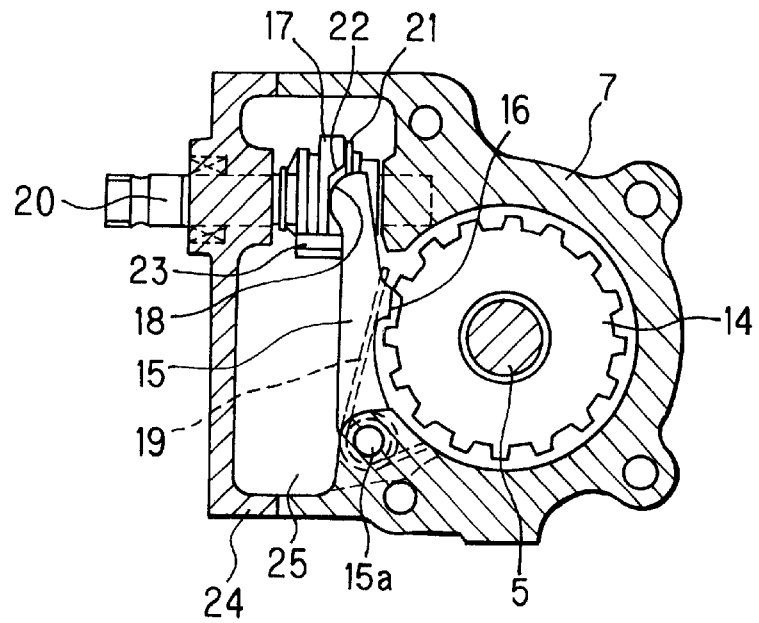
FIG. 2 is a partial front view when cut along a plane A—A in FIG. 1.
Figure 3:
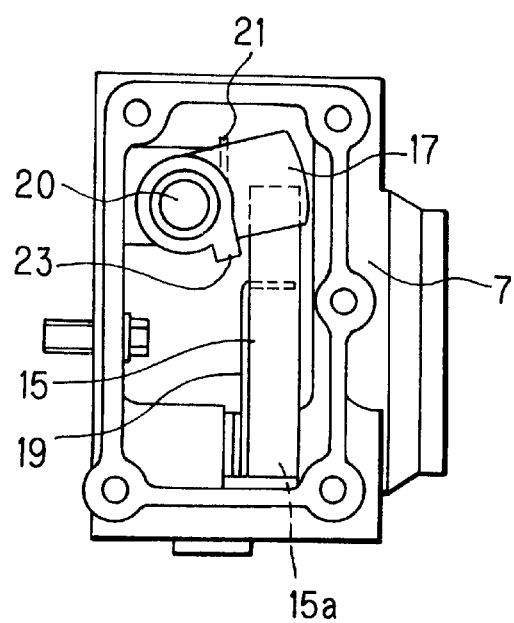
FIG. 3 is a partial side view when viewed in a direction B.

As shown in FIGS. 1 to 3, a parking gear 14 is fixed at the vicinity of the rear end of intermediate shaft 5 inserted in housing 7. Housing 7 of the final reduction gear is composed of two parts, i.e., a parking assembly side 7a and carrier side 7b. Parking assembly side 7a axially supports intermediate shaft 5 and carrier side 7b axially supports pinion shaft 9 and output shaft bevel gear 11 meshing pinion gear 10 located at the distal end of pinion shaft 9. Since intermediate shaft 5 is coupled with pinion shaft 9 by way of coupling sleeve 8 as stated above, it is possible to restrain the rotation of pinion shaft 9 (hence axle shafts 12) by fixing the aforementioned parking gear 14. Parking assembly side 7a of the housing is joined to the carrier side 7b by means of bolts or other fasteners, so that they can separate from each other. Therefore, this embodiment can be realized by changing the parking gear side assembly in the existing housing.

Provided in the parking lock device is an engagement piece 15 having a claw (engagement projection) 16 engageable with parking lock gear 14. This engagement piece 15 is axially supported at its proximal end on a pivot shaft 15a parallel to pinion shaft 9 so that the engagement piece is cantilevered and can sway in the direction approximately perpendicular to pinion shaft 9. Claw 16 is formed on one side, with respect to the direction of swaying, close to pinion shaft 9 at the approximately middle portion of the engagement piece while a projection 18 abutting a cam 22 of a cam plate 17 is formed on the opposite side, with respect to the direction of swaying, at the distal end of the engagement piece 15.

Cam plate 17 is to sway engagement piece 15 by abutting the cam surface of cam 22 against the aforementioned projection 18. That is, cam plate 17 is axially supported on an actuator shaft (cam shaft) 20 arranged in housing 7 perpendicularly to pinion shaft 9 so that it can relatively rotate. As cam plate 17 rotates, engagement piece 15 sways in conformity with the cam shape of cam 22, so that claw 16 of engagement piece 15 can become engaged with or disengaged from parking gear 14 whereby parking lock mechanism can be locked or unlocked. Here, engagement piece 15 is urged by a release spring 19 so that it comes away from lock gear 14.

Cam plate 17 is pivotally supported on actuator shaft 20 and is provided with a pressing spring (urging element) 21 which urges cam plate 17 to rotate in one direction about actuator shaft 20. This pressing spring 21 is arranged so as to urge cam plate 17 against the actuator arm 23 side and urge cam 22 of cam plate 17 against projection 18. Further, this pressing spring 21 provides an elastic force sufficient enough to keep on pressing actuator arm 23 and cause cam plate 17 to rotate following the rotation of actuator shaft 20 under the conditions where the release spring 19 is pressing projection 18 of engagement piece 15 against cam 22.

Further, actuator shaft 20 has an actuator arm (claw) 23 on its peripheral side. This actuator arm 23 restrains an excessive rotation of cam plate 17 due to the urging force of pressing spring 21 in its urging direction. When parking lock is released and actuator shaft 20 rotates in the direction opposite to the urging direction, actuator arm 23, whilst abutting cam plate 17, can still rotate, and hence rotates cam plate 17 opposing the urging force of pressing spring 21 so as to separate cam 22 from projection 18.

Formed in housing 7 is an opening 25 at a position corresponding to parking gear 14. A substantially cup-shaped partial lid 24 for axially supporting actuator shaft 20 is arranged so as to close the opening 25. A lever 26 which can be operated manually or other means is attached to this actuator shaft 20 at a position outside partial lid 24.

Figure 5A:
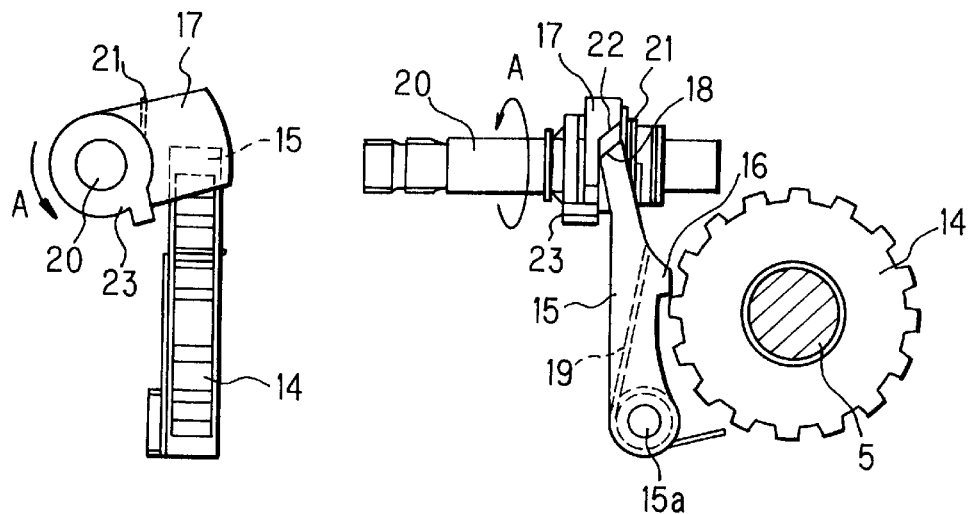
FIGS. 5A to 5C are diagrams, with side views on the left and front views on the right, showing the action of a parking lock device in accordance with the embodiment, FIG. 5A showing a state when parking lock is free, FIG. 5B showing a state when parking lock is waiting to be locked, FIG. 5C showing a state when parking lock is being locked.

Here, as shown in FIG. 5A, when actuator shaft 20 is turned in the releasing direction (designated by arrow A) so that actuator arm 23 presses cam plate 17 opposing the pressure of pressing spring 21, the raised portion of cam 22 separates from projection 18. Engagement piece 15 then is moved by elastic force of release spring 19 and sways in the direction away from parking gear 14 hence claw 16 is disengaged from lock gear 14. This makes parking gear 14 free and allows it to rotate. Therefore, intermediate shaft 5 can also become able to turn so as to establish the power-transmissible drive state (in the driving function mode).

Figure 5B:
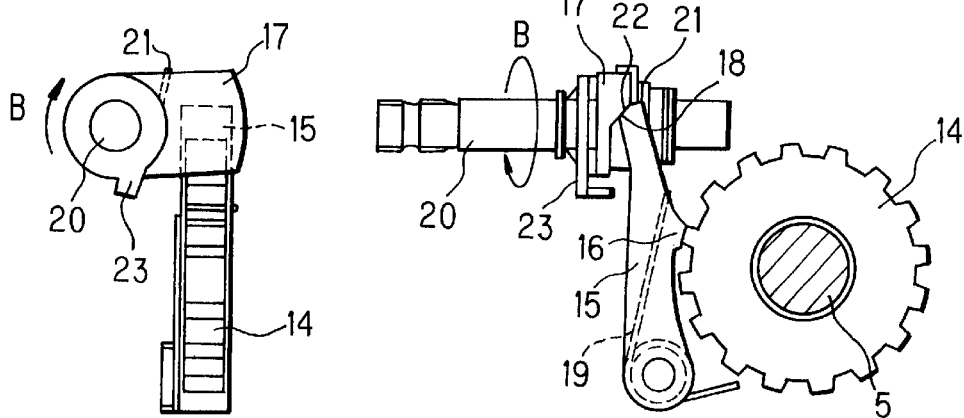

On the other hand, when actuator shaft 20 is turned in the locking direction (designated by arrow B) as shown in FIG. 5B so as to release the pressure onto cam plate 17, cam plate 17 presses projection 18 of engagement piece 15 by elastic force of pressing spring 21 so that engagement piece 15 moves to the parking gear 14 side opposing the pressure of release spring 19. When claw 16 of engagement piece 15 abuts the raised portion of parking gear 14, the engagement piece is held off at that position (in the waiting function mode).

Figure 5C:
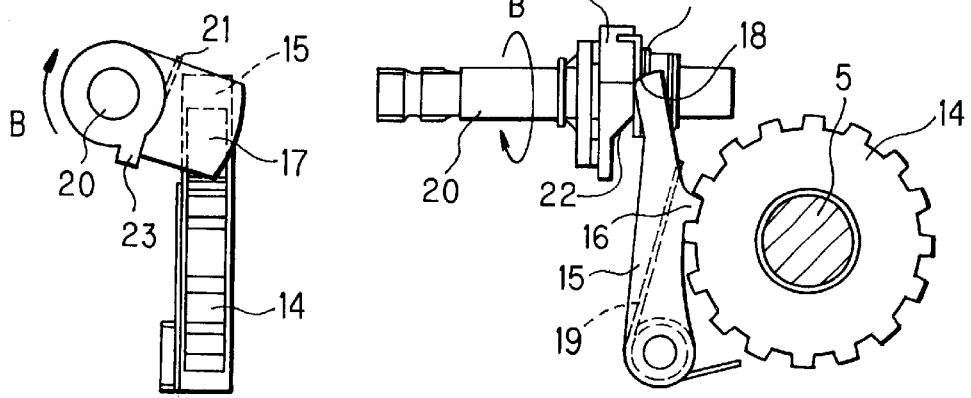

Then, as parking lock gear 14 turns a small amount from the aforementioned waiting position so that claw 16 meets the indented portion of lock gear 14 as shown in FIG. 5C, engagement piece 15 is moved further by the elastic force of pressing spring 21, opposing the pressure of release spring 19 so that claw 16 comes to mesh lock gear 14 to fix intermediate shaft 5 and hence create the parking state (in the parking function mode).

As described above, according to the parking lock device of the present embodiment, parking lock of the axle shafts of rear wheels 34 can be actuated by providing lock gear 14 fixed on intermediate shaft 5 at a position inside housing 7, arranging engagement piece 15 with claw 16 nearby so that claw 16 meshes lock gear 14 to thereby keep intermediate shaft 5 from rotating. Moreover, when engagement piece 15 comes to mesh lock gear 14, lock gear 14 can be held off and wait until next indentation of lock gear 14 comes in place if engagement piece 15 abuts the raised portion of lock gear 14.

Further, since lock gear 14, engagement piece 15, cam plate 17, actuator shaft 20 and other necessary parts can be compactly laid out in the area enclosed by partial lid 24 at the front portion of housing 7, this configuration needs fewer modified parts in housing 7 and can be achieved with a low cost.

As has been described heretofore, since the present invention has been configured as above, the parking lock device is arranged inside the housing in which the input shaft is axially supported so that the input shaft on the input side of the final reduction gear is locked. Therefore, it is possible to reduce the necessary braking force in the proportion of the gear ratio of the final reduction gear as well as provide a compact lightweight parking lock device at a reduced cost.

The parking lock mechanism can be made compact by providing the pivot element in the form of a cantilever. Further, since the pivot shaft and the cam shaft are laid out so as to be orthogonal to each other because of the positional relationship with the input shaft, the swaying direction of the pivot element and the rotational direction of the cam element are positioned approximately perpendicularly to each other, thus making it possible to reduce the layout space of the cam element.

What is claimed is:

1. A parking lock device for a saddle riding type vehicle, wherein engine power is transmitted as it is being varied in speed to axle shafts via a final reduction gear which is comprised of an input shaft having a pinion gear at a distal end thereof, a housing axially supporting the input shaft, a bevel gear disposed on an output shaft side and meshing the pinion gear and a carrier axially supporting the bevel gear, the axle shafts being suspended by a suspending mechanism separate from the final reduction gear and wherein a casing of a gear transmission and an engine are integrally formed and the input shaft has a universal joint attached thereto at about a partway position thereof, the parking lock device comprising:

a parking gear fixed on the input shaft;

a pivot element cantilevered and axially supported on a pivot shaft in the housing and having a projection on one side thereof, with respect to the direction of swaying, so that the projection is able to engage the parking gear; and a cam element axially supported on a cam shaft in the housing and abutting the pivot element on the opposite side with respect to a direction of swaying so as to sway the pivot element, wherein the pivot element sways as the cam element rotates so that the engagement projection of the pivot element becomes engaged with or disengaged from the parking gear to thereby lock and release the parking lock.

2. The parking lock device for a saddle riding type vehicle according to claim 1, wherein the cam element is comprised of the cam shaft supported on the housing, a cam plate rotatable about the cam shaft and an urging element which rotationally urges the cam plate in one direction about the cam shaft.

3. The parking lock device for a saddle riding type vehicle according to claim 2, wherein the cam shaft is formed with a claw portion which restrains an excessive rotation of the cam plate due to the urging element in its urging direction and when the parking lock is released the claw portion is able to rotate whilst keeping an abutment thereof against the cam plate.

* * * * *